United States Patent [19]

Nakao et al.

[11] Patent Number: 5,363,668
[45] Date of Patent: Nov. 15, 1994

[54] ABSORPTION AIR CONDITIONING SYSTEM AND COOLING/HEATING CHANGING-OVER METHOD

[75] Inventors: Takashi Nakao, Ibaraki; Hiroaki Yoda, Tsuchiura, both of Japan

[73] Assignee: Hitachi, Ltd., Tokyo, Japan

[21] Appl. No.: 18,375

[22] Filed: Feb. 16, 1993

[30] Foreign Application Priority Data

Mar. 18, 1992 [JP] Japan ................. 4-061856

[51] Int. Cl.⁵ .............................................. F25B 15/00
[52] U.S. Cl. ........................................ 62/141; 62/159; 62/185; 62/324.2
[58] Field of Search .......... 62/104, 141, 146, 159–177, 62/184, 185, 324.2, 476; 237/8 C

[56] References Cited

U.S. PATENT DOCUMENTS

| | | | |
|---|---|---|---|
| 3,002,359 | 10/1961 | Miner | 237/8 C |
| 3,292,385 | 12/1966 | Murray | 62/159 |
| 3,426,547 | 2/1969 | Foster | 62/141 |
| 3,636,721 | 1/1972 | Rex | 62/185 |
| 4,206,874 | 6/1980 | Semple | 237/8 C |
| 4,275,709 | 6/1981 | Rubi | 126/422 |
| 4,665,709 | 5/1987 | Perry | 62/141 |

Primary Examiner—Henry A. Bennet
Assistant Examiner—William C. Doerrler
Attorney, Agent, or Firm—Antonelli, Terry, Stout & Kraus

[57] ABSTRACT

To provide an absorption air conditioning system and cooling/heating change-over method which do not make users uncomfortable just after a cooling mode is changed to a heating mode and vice versa, there is provided an absorption air conditioning system including an absorption cool water/hot water making machine for producing cool water/hot water for air conditioning, a room machine for carrying out the air conditioning of a room by circulation of the cool water/hot water from the absorption cool water/hot water making machine, and a piping for introducing the cool water/hot water from the absorption cool water/hot water making machine to the room machine, wherein the system further includes a bypass piping connected between the absorption cool water/hot water making machine and the room machine through a valve, and a means for opening/closing the valve.

5 Claims, 4 Drawing Sheets

ABSORPTION AIR CONDITIONING SYSTEM AND COOLING/HEATING CHANGING-OVER METHOD

BACKGROUND OF THE INVENTION

Field of the Invention

The present invention relates to an absorption air conditioning system having an absorption cool water/hot water making machine and to a cooling/heating change-over method of the absorption type air conditioning system, and more specifically, to a cooling/heating change-over system and method in which the cooling mode and heating mode of the absorption cool water/hot water making machine can be switched or changed over through a room machine.

Description of the Related Art

In an absorption air conditioning system having an absorption cool water/hot water making machine, when the cooling mode and heating mode of the absorption cool water/hot water making machine is changed over from a room machine, that is, for example, when the cooling operation of the absorption cool water/hot water making machine is changed to heating operation in response to a change-over command to a heating mode supplied from the room machine, cool air is supplied from the room machine for some period of time because the cool water/hot water in a piping connecting the absorption cool water/hot water making machine to the room machine is at a low temperature, and on the contrary, when the heating mode is changed to a cooling mode, hot air is supplied from the room machine for some period of time.

This kind of absorption air conditioning system having the absorption cool water/hot water making machine is disclosed in Japanese Patent Unexamined Publication No. (Hei) 3-271666.

The aforesaid prior art has a problem in that when cooling operation is changed to heating operation or the heating operation is changed to the cooling operation, cool air or hot air continues to be supplied for some period of time, which gives users in a room an uncomfortable feeling.

An object of the present invention is to solve the above problem i.e. to provide an absorption air conditioning system and cooling/heating change-over method in which cool air is supplied from a room machine in a cooling mode and hot air is supplied therefrom in a heating mode.

SUMMARY OF THE INVENTION

According to the present invention, there is provided an absorption air conditioning system including an absorption cool water/hot water making machine for producing cool water/hot water for air conditioning, a room machine for carrying out the air conditioning of a room by circulation of the cool water/hot water from the absorption cool water/hot water making machine, and a piping for introducing the cool water/hot water from the absorption cool water/hot water making machine to the room machine, wherein the system comprises a bypass piping connected between said absorption cool water/hot water making machine and said room machine through a valve, and a means for opening/closing said valve.

Further, according to the present invention, there is provided a cooling/heating change-over method of an absorption air conditioning system for carrying out air conditioning of a room by introducing cool water or hot water produced in an absorption cool water/hot water making machine to a room machine through a piping and producing cool air or hot air by heat exchange of the cool water or hot water with air in the room machine, wherein when a cooling mode is changed to a heating mode, a temperature of the cool water at an outlet of said absorption cool water/hot water making machine is sensed, a supply of cool water from said absorption cool water/hot water making machine to said room machine is stopped while said cool water is bypassed until said cool water reaches a preset temperature to be hot water as well as air is not supplied from said room machine, and wherein the hot water, which is obtained by heating the cool water which has been returned to said absorption cool water/hot water making machine by heating operation of said absorption cool water/hot water making machine, is supplied to said room machine to start heating operation of said room machine.

As for the function or operation of the present invention, when the cooling mode is changed to the heating mode or when the heating mode is changed to the cooling mode, the temperature sensor senses a temperature of the cool water or hot water in the absorption cool water/hot water making machine and room machine, the cool water or hot water from the absorption cool water/hot water making machine is not supplied to the room machine but is bypassed while the room machine does not supply air until the cool water or hot water is heated or cooled to a preset temperature to be hot water or cool water. The hot water or cool water, which is obtained by heating or cooling the cool water or hot water that has been returned to the absorption cool water/hot water making machine by the heating operation or cooling operation of the absorption cool water/hot water making machine, is supplied to the room machine to start the heating operation or cooling operation of the room machine.

DESCRIPTION OF PREFERRED EMBODIMENT

Figure 1:
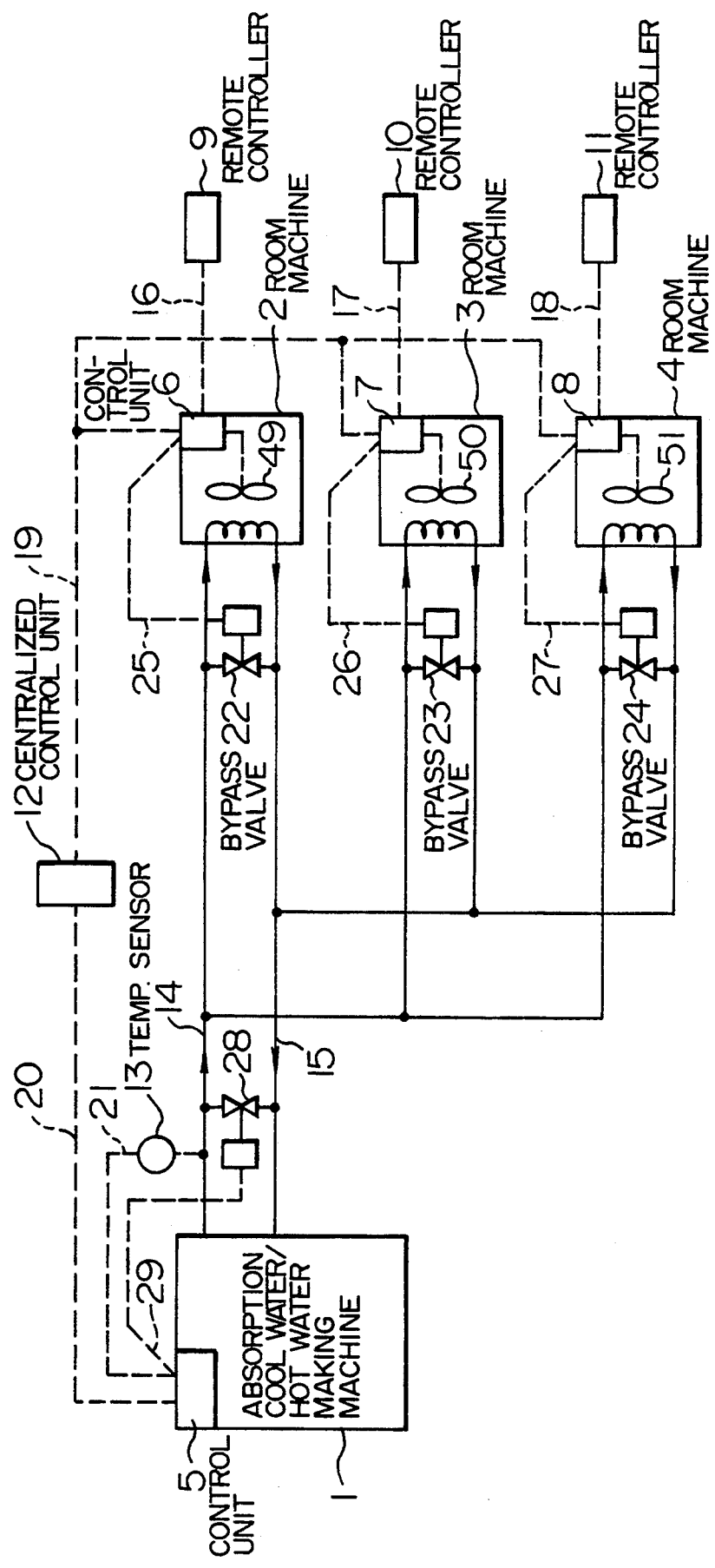
FIG. 1 is a system diagram of an embodiment according to the present invention.

FIG. 1 is a system diagram of an embodiment according to the present invention.

Cool water/hot water produced in an absorption cool water/hot water making machine 1 is distributed to a plurality of room machines 2, 3 and 4 through pipings 14. The cool water/hot water subjected to heat exchange with air by blowers 49, 50 and 51 in the room machines 2, 3 and 4 is gathered and returned to the absorption cool water/hot water making machine 1 through pipings 15. On the other hand, the air subjected to the heat exchange with the cool water/hot water by the blowers 49, 50 and 51 in the room machines 2, 3 and 4 is used for cooling or heating respective rooms as cool air or hot air.

Further, a control unit 5 is provided with the absorption cool water/hot water making machine 1, control units 6, 7 and 8 are provided with the room machines 2, 3 and 4, and remote controllers 9, 10 and 11 are connected to the control units 6, 7 and 8 through signal lines 16, 17 and 18. The control units 6, 7 and 8 are connected to a centralized control unit 12 through a signal line 19 so that the room machines 2, 3 and 4 are subjected to the centralized control of the centralized control unit 12.

Further, the centralized control unit 12 is connected to the control unit 5 of the absorption cool water/hot water making machine 1 through a signal line 20. The centralized control unit 12 transfers information of the room machines to the cool water/hot water making machine 1 through the signal line 20 as well as receives information from the cool water/hot water making machine 1 and transfers the same to the respective room machines 2, 3 and 4. The room machines 2, 3 and 4 have bypass pipings 22, 23 and 24 connected to the pipings 14 and 15 to bypass the cool water/hot water through bypass valves 22, 23 and 24, respectively. The bypass valves 22, 23 and 24 are connected to the control units 6, 7 and 8 of the room machines 2, 3 and 4 through signal lines 25, 26 and 27. Further, a temperature sensor 13 is mounted to the piping 14 at an outlet of the absorption cool water/hot water making machine 1 to sense the temperature of the cool water/hot water and supplies a temperature signal to the control unit 5 of the absorption cool water/hot water making machine 1 through a signal line 21. A bypass pipe 28 is provided with the outlet of the absorption cool water/hot water making machine 1 and connected to the control unit 5 of the absorption cool water/hot water making machine 1 through a signal line 29.

Figure 2:
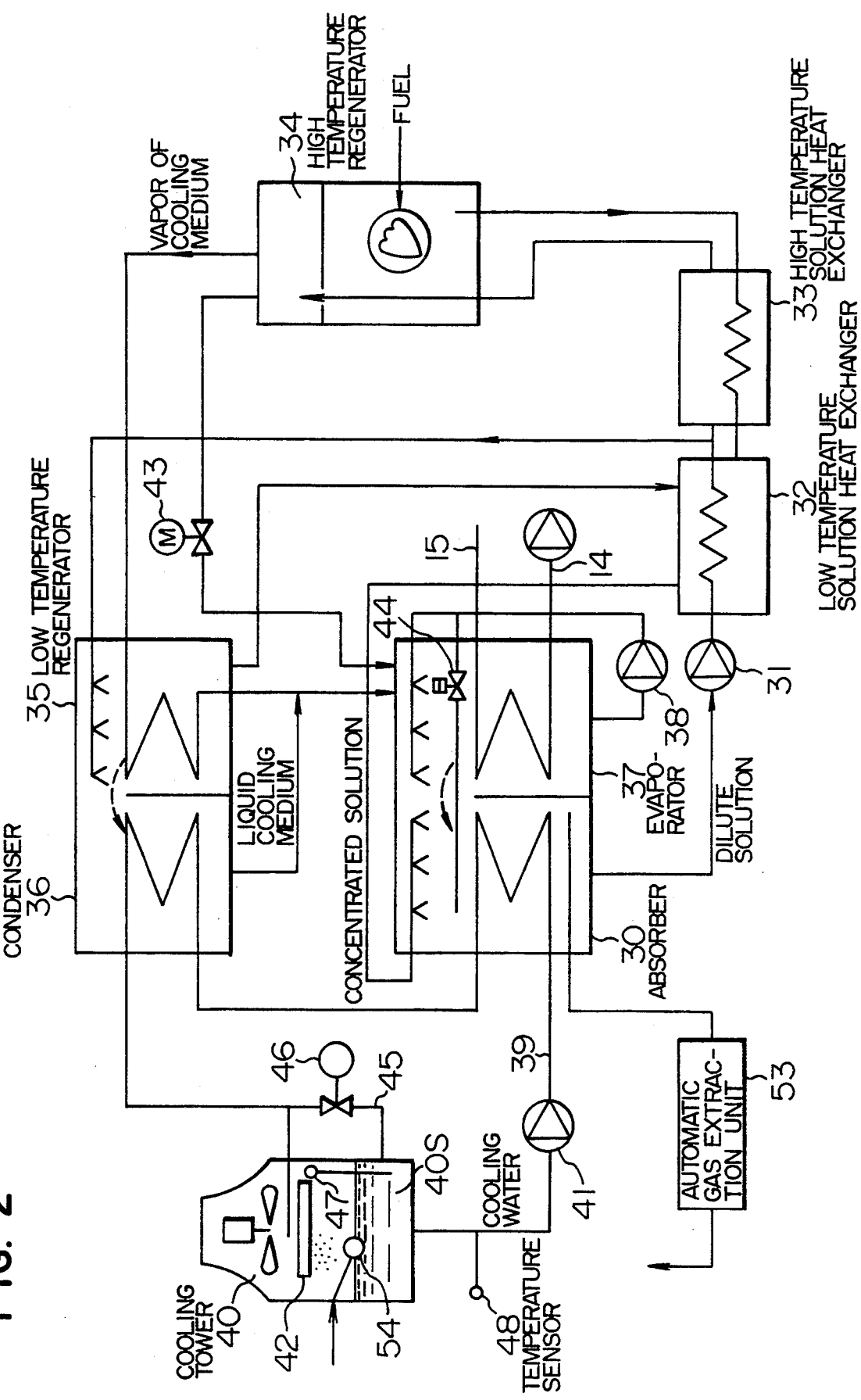
FIG. 2 is a diagram showing the arrangement of an absorption cool water/hot water making machine used in the embodiment of FIG. 1.

The arrangement or structure of the absorption cool water/hot water making machine 1 will now be described with reference to FIG. 2. The cooling mode/heating mode of the absorption cool water/hot water making machine 1 can be changed from one mode to the other mode and vice versa in response to a signal from a room and a cooling cycle/heating cycle is carried out as described below.

First, in cooling operation, automatic cooling/heating change-over valves 43 and 44 are closed in response to a cooling/heating change-over operation signal. On the other hand, a dilute solution diluted by a cooling medium (water) in an absorber 30 is supplied by a solution pump 31 to a high temperature regenerator 34 through a low temperature solution heat exchanger 32 and high temperature solution heat exchanger 33 and heated in the high temperature regenerator 34 so that the solution is concentrated by an evaporation of the cooling medium. Further, the dilute solution branched from an outlet of the low temperature solution heat exchanger 32 and supplied to a low temperature regenerator 35 is subjected to a heat exchange with vapor of the cooling medium produced from the high temperature regenerator 34 and concentrated by producing secondary vapor of the cooling medium. The dense or concentrated solution concentrated by the high temperature regenerator 34 and passing through the high temperature heat exchanger 33 passes through the low temperature solution heat exchanger 32 together with the solution concentrated by the low temperature regenerator 35 and give sensible heat to the dilute solution in these solution heat exchangers 32 and 33 and are then sprayed in the absorber 30. On the other hand, the vapors of the cooling medium produced in the high temperature regenerator 34 and low temperature regenerator 35, respectively, are condensed in the low temperature regenerator 35 and a condenser 36 and flow into an evaporator 37 in the form of the solution of the cooling medium. The cooling medium is sprayed into the evaporator 37 by a cooling medium spray pump 38 and evaporated by obtaining a heat of evaporation from the cool water/hot water in the cool water/hot water return piping 15 and then absorbed into the concentrated solution sprayed in the absorber 30 through the vapor path communicating the evaporator 37 with the absorber 30. A heat of absorption produced at that time is removed by cooling water circulating in a cooling water piping 39. Further, the cooling water circulates to the condenser 36 through the absorber 30 and gets the heat of condensation of the vapor of the cooling medium produced in the low temperature regenerator 35 and then cooled by a cooling tower 40. The cooling water is circulated by a pump 41. A numeral 42 in the cooling tower 40 designates a Raschig ring.

On the other hand, the automatic cooling/heating change-over valves 43 and 44 are opened in heating operation. The vapor of the cooling medium produced in the high temperature regenerator 34 flows into the evaporator through the automatic cooling/heating change-over valve 43 without passing through the low temperature regenerator and is condensed by heating the cool water/hot water in the cool water/hot water return piping 15. The solution of the condensed cooling medium is supplied to the absorber 30 by the cooling medium spray pump 38 through the automatic cooling/heating change-over valve 44 and made to be a dilute solution by diluting the concentrated solution sprayed in the absorber 30 and is then supplied again to the high temperature regenerator 34 and low temperature regenerator 35 by the solution pump 31. The cooling water circulation pump 41 is stopped in this heating cycle, no heat exchange is carried out in the absorber 30 and condenser 36 and the cooling tower 40 remains stopped. An automatic gas extraction unit 53 discharges a noncondensable gas in the apparatus kept under a pressure less than an atmospheric pressure.

Figure 3:
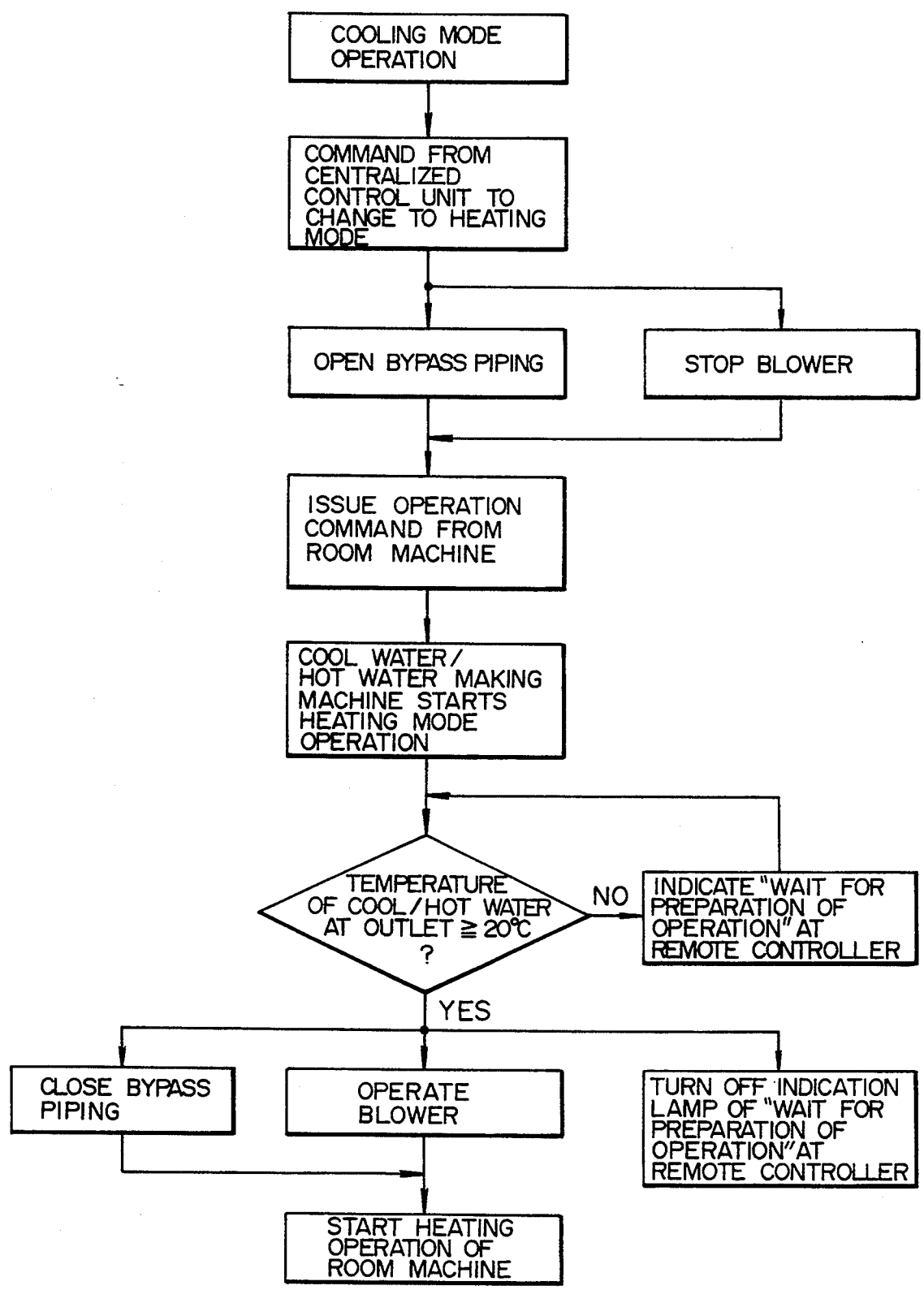
FIG. 3 is a flow diagram of control effected in the embodiment according to the present invention when cooling operation is changed to heating operation.

Now, the operation of elements in FIG. 1 effected when a cooling mode is changed to a heating mode will be described with reference to the cooling/heating change-over flow of FIG. 3.

When it is assumed that the system in the cooling mode is changed to the heating mode as a whole by the operation of the centralized control unit 12, first, the bypass pipes 22, 23 and 24 are opened, the operation of the room machines 2, 3 and 4 is interlocked, i.e. forced to be stopped by a command concerned, and the blowers 49, 50 and 51 are stopped. Next, when an operation command is issued from any one of the room machines 2, 3 and 4 by a remote controller, the cool water/hot water making machine 1 starts heating operation. At this time, when a water temperature sensed by the temperature sensor 13 has increased or is above a preset temperature (in the case of FIG. 3, this temperature is assumed to be 20° C., the preset temperature being high enough not to cause the users of air supplied from the room machines 2, 3 and 4 to feel cool or cold), the bypass piping of the room machine from which the operation command has been issued is closed, hot water is supplied to the room machine, the interlock of the room machine is released, and the operation of only the blower of the room machine from which the operation command has been issued is started. Thus, hot air is supplied from the room machine and the heating operation is started.

On the contrary, when the water temperature sensed by the temperature sensor 13 is not increased to the preset temperature, the bypass pipes 22, 23 and 24 remain open, the water is not supplied to the room machines 2, 3 and 4, and the interlock of the operation of the room machines 2, 3 and 4 is maintained so that the room machines 2, 3 and 4 are not operated even if the start operation thereof is the command by the remote controller. During this time, the cool water/hot water making machine 1 continues the heating operation. Further, at this time, a message such as "wait for preparation of heating operation" or the like is indicated or displayed at the remoter controller to indicate to the users that a water temperature is increasing.

Figure 4:
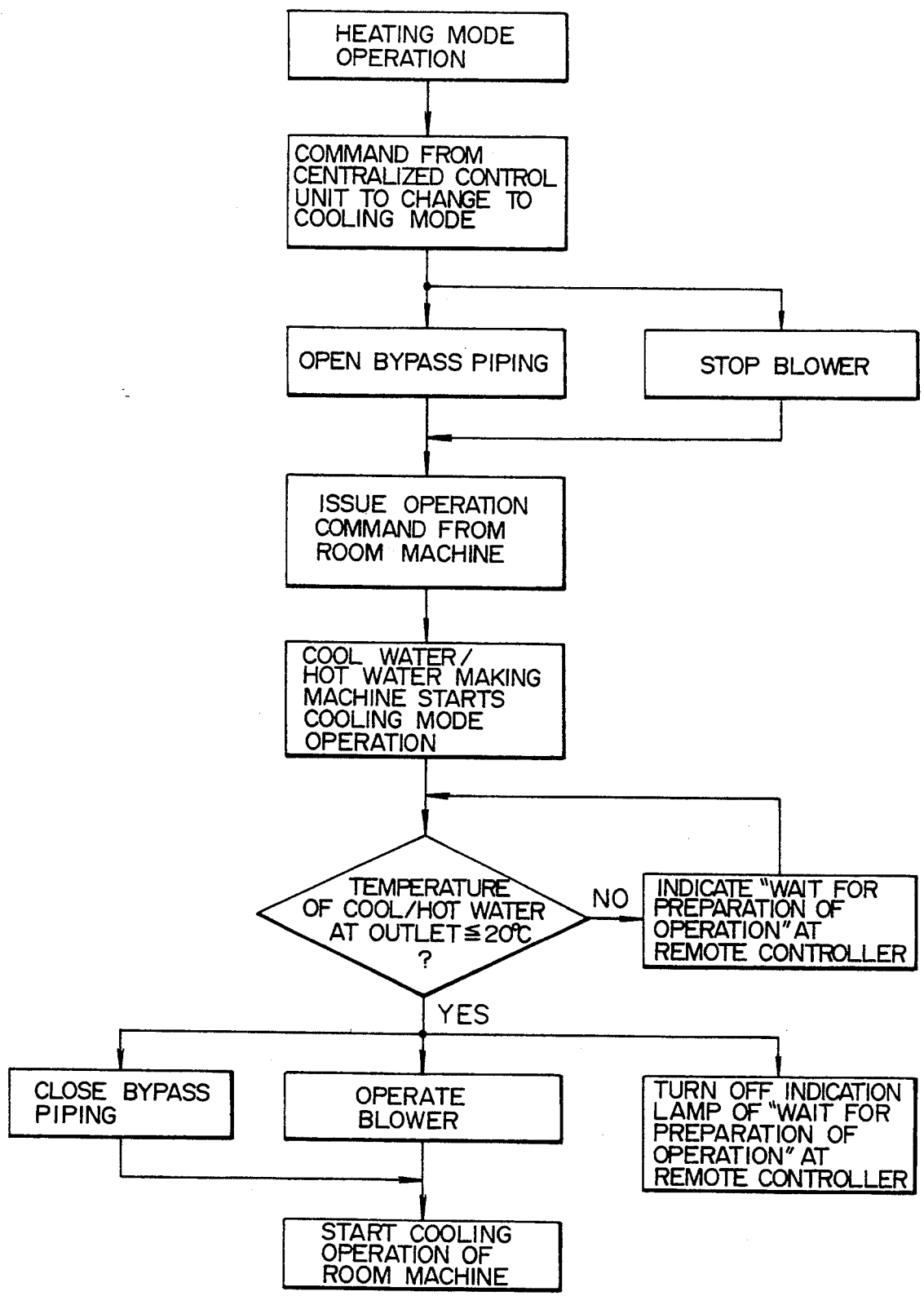
FIG. 4 is a flow diagram of control effected in the embodiment according to the present invention when heating operation is changed to cooling operation.

Next, the operation of elements in FIG. 1 effected when the heating mode is changed to the cooling mode will be described with reference to the heating/cooling change-over flow of FIG. 4.

When the system in the heating mode is changed to the cooling mode as a whole by the operation of the centralized control unit 12, first, the bypass pipes 22, 23 and 24 are opened, the operation of the room machines 2, 3 and 4 is interlocked and the operation of the blowers 49, 50 and 51 is stopped. Next, when an operation command is issued from any one of the room machines 2, 3 and 4 by a remote controller, the absorption cool water/hot water making machine 1 starts cooling operation. At this time, when a water temperature sensed by the temperature sensor 13 has been lowered or is below a preset temperature (in the case of FIG. 4, this temperature is 20° C., the preset temperature being low enough not to cause the users of air supplied from the room machines to feel hot), the bypass piping of the room machine from which the operation command has been issued is closed, a cool water is supplied to the room machine, the interlock of the room machine is released, and the operation of only the blower of the room machine from which the operation command has been issued is started. Thus, cool air is supplied from the room machine and the cooling operation is started.

On the contrary, when the water temperature sensed by the temperature sensor 13 has not been lowered to the preset temperature, the bypass pipes 22, 23 and 24 remain open, the water is not supplied to the room machines 2, 3 and 4, and the interlock of the operation of the room machines 2, 3 and 4 is maintained so that the room machines 2, 3 and 4 are not operated even if the start operation thereof is commanded by the remote controller. During this time, the cool water/hot water making machine 1 continues the cooling operation. Further, at this time, a message such as "wait for preparation of cooling operation" or the like is indicated or displayed at the remoter controller to indicate to the users that a water temperature is lowering.

Meanwhile, when water being supplied to all the room machines 2, 3 and 4 must be stopped, the water supply to the machines 2, 3 and 4 can be simply stopped by opening the bypass piping 28 provided at the outlet of the absorption cool water/hot water making machine 1. The aforesaid change-over of cooling operation and heating operation can be effected only by the bypass piping 28 even if the bypass pipings 22, 23 and 24 are omitted.

Further, the same effect can be achieved by controlling only the blowers 49, 50 and 51 to operate/stop without the provision of the bypass pipings 22, 23 and 24.

Incidentally, although cooling water is conventionally discharged in heating operation as a treatment of water when cooling operation/heating operation is changed, the cooling water is not discharged in the embodiment of the present invention but kept in the system, which will now be described with reference to FIG. 2. Water is supplemented or added to the cooling tower 40 through a ball tap valve 54 so that a water level in the water storage or reservoir 40S of the cooling tower 40 is kept at a given level through all seasons. With this arrangement, the cooling water piping system is full of water at all times. Further, a bypass piping 45 and an automatic valve 46 of the cooling tower 40 are connected to a cooling water piping extending to the cooling tower 40 through the absorber 30 and condenser 36. When heating operation is changed to cooling operation, the cooling water pump 41 is operated and at the same time the automatic valve 46 is opened and thus the cooling water is supplied to the water reservoir 40S of the cooling tower through the bypass piping 45 and mixed therein so that the temperature thereof is lowered. Then, the automatic valve 46 is closed after a predetermined time and the cooling water is supplied to the cooling tower 40 and thus a normal cooling operation is carried out. With this control, particularly in a case where a heating operation is immediately changed to a cooling operation at the completion of the heating operation, possibilities that hot water (cooling water) of about 70°-80° C. present in the absorber 30 and condenser 36 during the heating operation falls onto the Raschig ring 42 of the cooling tower 40 and that the function or performance of the cooling tower 40 is degraded due to deformation and the like of the Raschig ring 42 can be prevented.

Next, as a freeze-prevention measure of the cooling water piping system in winter, a cooling water temperature sensor 48 is provided with the cooling water piping system on a low temperature side (e.g., a suction piping of the cooling water circulation pump 41 or an interior of the water reservoir 40S of the cooling tower 40) and freeze-preventing operation is carried out by using the sensor 48. When a temperature of the cooling water is lowered below a preset temperature, a heating operation is started. Then, when a level switch 47 provided to monitor a water level of the water receiver 40S senses that the water level is higher than a preset level, the cooling water circulation pump 41 is operated. The cooling water receives a heat of absorption and heat of condensation to increase its temperature while passing through the absorber 30 and condenser 36 and thus the cooling water can be prevented from being frozen.

What is claimed is:

1. A cooling/heating change-over method of an absorption air conditioning system which includes an absorption cool water/hot water making machine for producing cool water in a cooling mode of operation and for producing hot water in a heating mode of operation for air conditioning, a room machine for carrying out the air conditioning of a room by circulation therethrough of the cool water/hot water from the absorption cool water/hot water making machine and by flowing of air through the room machine, a water circulation piping for allowing the cool water/hot water to circulate from the absorption cool water/hot water making machine through the room machine and back to the making machine, and changeover control means for changing the mode of operation of the system between the cooling mode and the heating mode, the method comprising:

upon changing the system from the cooling mode of operation to the heating mode of operation, constantly detecting a temperature of the water at an outlet of the absorption cool water/hot water making machine after the making machine has been changed to the heating mode of operation,
(a) when the detected temperature of the water is lower than a predetermined temperature,
   i) opening a bypass valve disposed in a bypass pipe connecting between a supply part, of the water circulation piping, for supplying the water from the making machine to the room machine, and a return part of the water circulation piping, for returning the water from the room machine to the making machine so as to bypass the room machine, thereby stopping supply of the water to the room machine, and
   ii) stopping flow of air through the room machine; and
(b) when the detected temperature, at the outlet of the making machine, of the water having been heated by the making machine in the heating mode of operation is raised to a level not lower than the predetermined temperature,
   i) closing the bypass valve to prevent the bypassing of the water through the bypass pipe, thereby starting to supply the water to the room machine; and
   ii) starting to flow the air through the room machine.

2. A cooling/heating change-over method of an absorption air conditioning system which includes an absorption cool water/hot water making machine for producing cool water in a cooling mode of operation and for producing hot water in a heating mode of operation for air conditioning, a room machine for carrying out the air conditioning of a room by circulation therethrough of the cool water/hot water from the absorption cool water/hot water making machine and by the flowing of air through the room machine, a water circulation piping for allowing the cool water/hot water to circulate from the absorption cool water/hot water making machine through the room machine and back to the making machine, and changeover control means for changing the mode of operation of the system between the cooling mode and the heating mode, and the method comprising:

upon changing the system from the cooling mode of operation to the heating mode of operation, constantly detecting a temperature of the water at an outlet of the absorption cool water/hot water making machine after the making machine has been changed to the heating mode of operation,
(a) when the detected temperature of the water is lower than a predetermined temperature,
   i) opening a bypass valve disposed in a bypass pipe connecting between a supply part, of the water circulation piping, for supplying the water from the making machine to the room machine, and a return part, of the water circulation piping, for returning the water from the room machine to the making machine so as to bypass the room machine, thereby stopping supply of the water to the room machine;
   ii) stopping flowing of air through the room machine; and
   iii) performing an indication of "wait for preparation of heating operation" of the room machine, to prepare for the heating mode of operation of the room machine, and
(b) when the detected temperature, at the outlet of the making machine, of the water having been heated by the making machine in the heating mode of operation is raised to a level not lower than the predetermined temperature,
   i) closing the bypass valve to prevent the bypassing of the water through the bypass pipe, thereby starting to supply the water to the room machine;
   ii) starting to flow the air through the room machine; and
   iii) stopping said indication, to start the heating mode of operation of the room machine.

3. A cooling/heating change-over method of an absorption air conditioning system which includes an absorption cool water/hot water making machine for producing cool water in a cooling mode of operation and for producing hot water in a heating mode of operation for air conditioning, a room machine for carrying out the air conditioning of a room by circulation therethrough of the cool water/hot water from the absorption cool water/hot water making machine and by the flowing of air through the room machine, a water circulation piping for allowing the cool water/hot water to circulate from the absorption cool water/hot water making machine through the room machine and back to the making machine, and changeover control means for changing the mode of operation of the system between the cooling mode and the heating mode, the method comprising:

upon changing the system from a heating mode of operation to a cooling mode of operation, constantly detecting a temperature of the water at an outlet of the absorption cool water/hot water making machine after the making machine has been changed to the cooling mode of operation,
(a) when the detected temperature of the water is higher than a predetermined temperature,
   i) opening a bypass valve disposed in a bypass pipe connecting between a supply part, of the water circulation piping, for supplying the water from the making machine to the room machine, and a return part of the water circulation piping, for returning the water from the room machine to the making machine so as to bypass the room machine, thereby stopping supply of water to the room machine, and
   ii) stopping flowing of air through the room machine; and
(b) when the detected temperature, at the outlet of the making machine, of the water having been cooled by the making machine in the cooling mode of operation is lowered to a level not higher than the predetermined temperature,
   i) closing the bypass valve to prevent the bypassing of the water through the bypass pipe, thereby starting to supply the water to the room machine, and
   ii) starting to flow the air through the room machine.

4. A cooling/heating change-over method of an absorption air conditioning system which includes an absorption cool water/hot water making machine for producing cool water in a cooling mode of operation and for producing hot water in a heating mode of operation for air conditioning, a room machine for carrying out the air conditioning of a room by circulation therethrough of the cool water/hot water from the absorption cool water/hot water making machine and by the flowing of air through the room machine, a water circulation piping for allowing the cool water/hot water to circulate from the absorption cool water/hot water making machine through the room machine and back to the making machine, and changeover control means for changing the mode of operation of the system between the cooling mode and the heating mode, the method comprising:

upon changing the system from the heating mode of operation to the cooling mode of operation, constantly detecting a temperature of the water at an outlet of the absorption cool water/hot water making machine after the making machine has been changed to the cooling mode of operation, (a) when the detected temperature of the water is higher than a predetermined temperature,
  i) opening a bypass valve disposed in a bypass pipe connecting between a supply part, of the water circulation piping, for supplying the water from the making machine to the room machine, and a return part, of the water circulation piping, for returning the water from the room machine to the making machine so as to bypass the room machine, thereby stopping supply of water to the room machine;
  ii) stopping flowing of air through the room machine; and
  iii) performing an indication of "wait for preparation of cooling operation" of the room machine, to prepare for the cooling mode of operation of the room machine; and (b) when the detected temperature, at the outlet of the making machine. of the water having been cooled by the making machine in the cooling mode of operation is lowered to a level not higher than the predetermined temperature,
  i) closing the bypass valve to prevent the bypassing of the water through the bypass pipe, thereby starting to supply the water to the room machine;
  ii) starting to flow the air through the room machine; and
  iii) stopping said indication, to start the cooling mode of operation of the room machine.

5. An absorption air conditioning system comprising an absorption cool water/hot water making machine for producing cool water/hot water for air conditioning, a room machine for carrying out the air conditioning of a room by circulation of the cool water/hot water from the absorption cool water/hot water making machine, a circulation piping for introducing the cool water/hot water from the absorption cool water/hot water making machine to the room machine, another piping through which cooling water of the absorption cool water/hot water making machine flows, a cooling tower, for dissipating a heat of the cooling water to an outside, having a water reservoir in a lower part thereof, and a change-over control means for changing a mode of operation of the system between a cooling mode and a heating mode, wherein the system further comprises a bypass pipe, connected at one end to said another piping and at another end to the water reservoir; and means for opening/closing a flow passage in the bypass pipe to allow a temporary flow of the cooling water from the making machine through the bypass pipe into the water reservoir upon changing of the system from the heating mode to the cooling mode.

* * * * *